April 28, 1964  A. A. BOGDAN  3,130,610
FLY CUTTERS WITH MICROMETIRICAL ADJUSTMENT
Filed Aug. 22, 1961  2 Sheets-Sheet 1
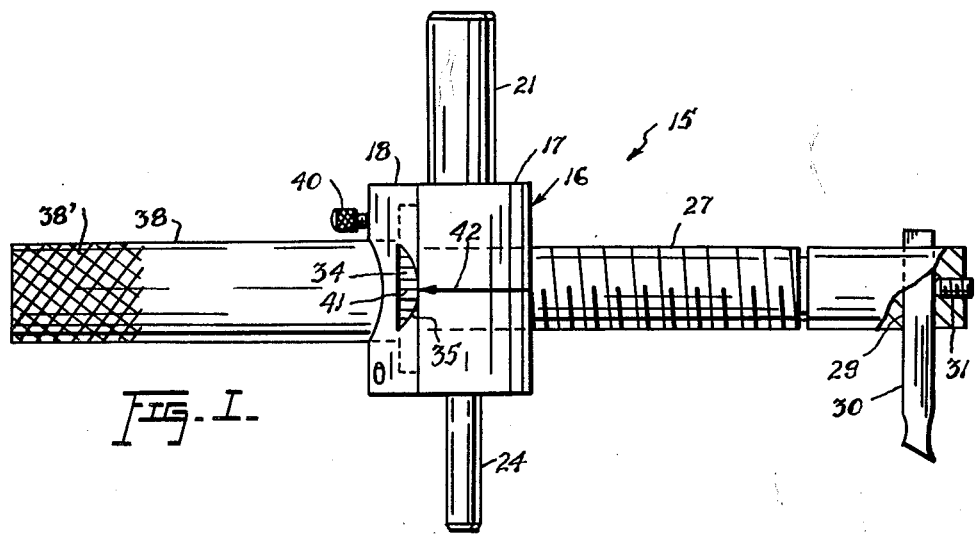
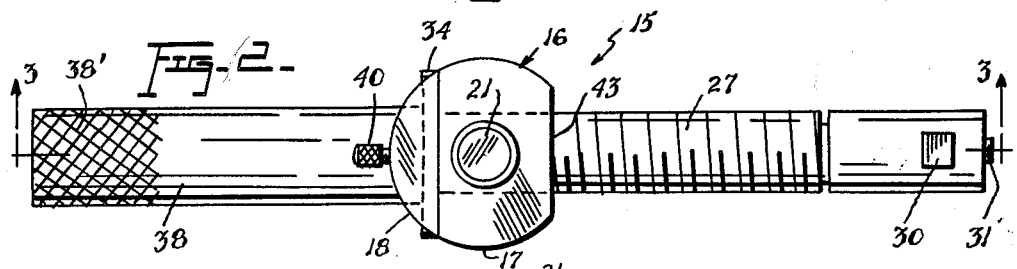
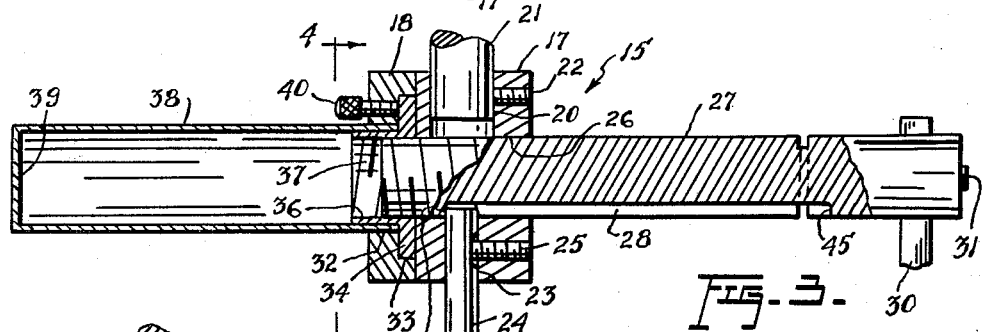
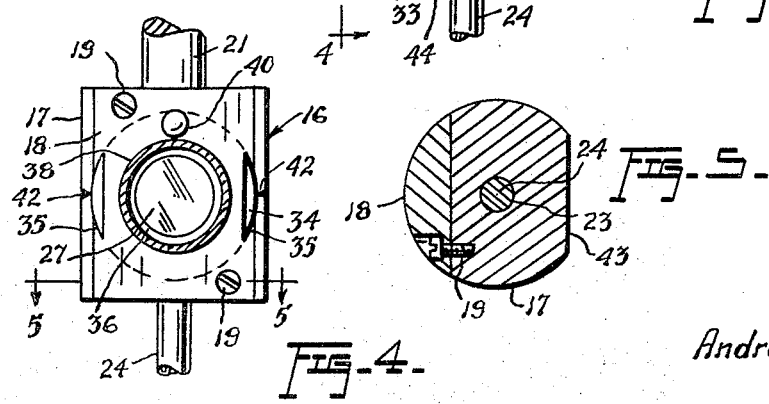
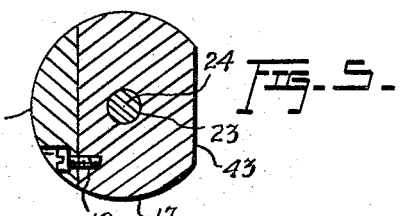
Inventor:
Andrew A. Bogdan

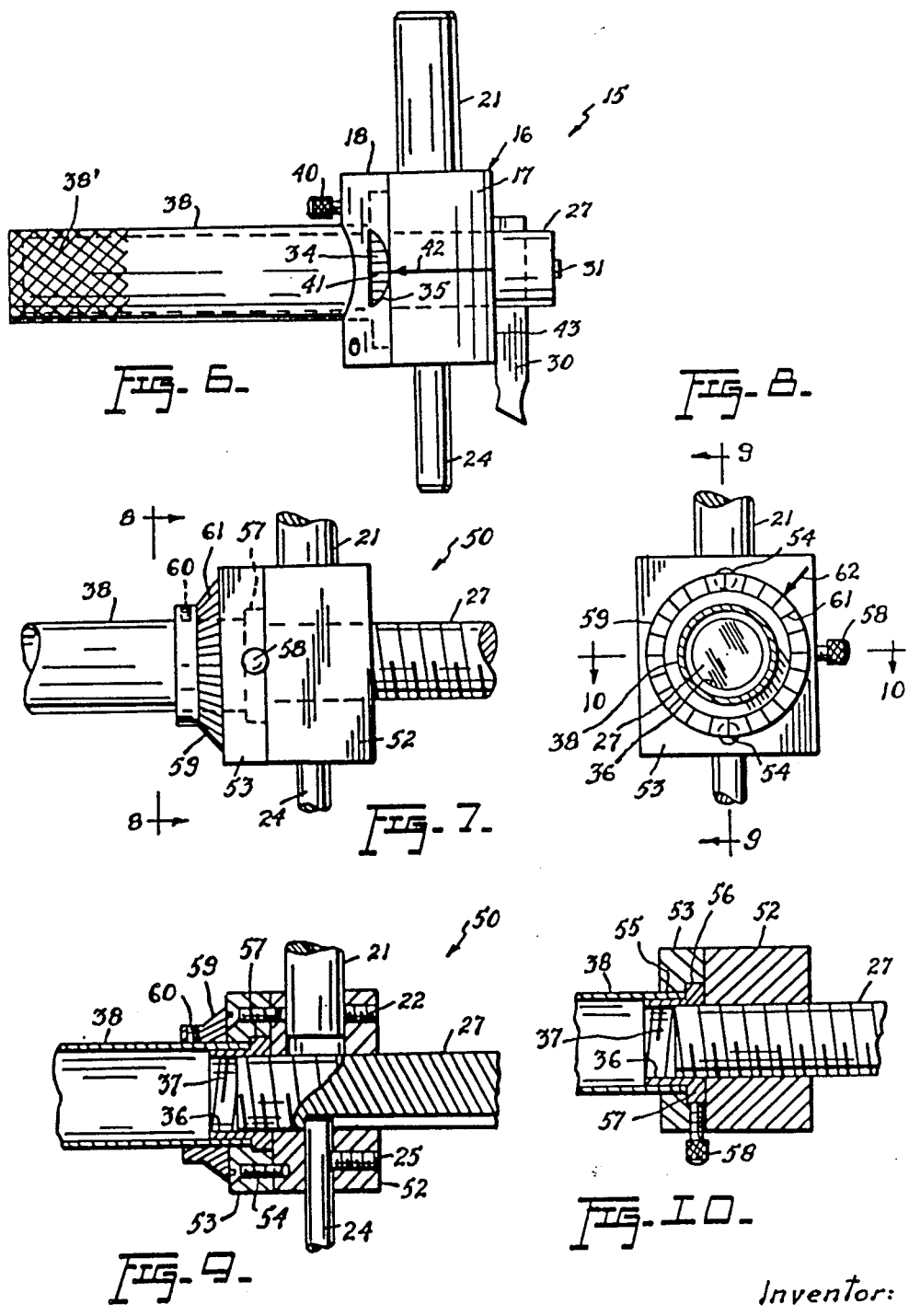

United States Patent Office 3,130,610
Patented Apr. 28, 1964

3,130,610
FLY CUTTERS WITH MICROMETRICAL ADJUSTMENT
Andrew A. Bogdan, 3103½ Dubois Ave., Baltimore 14, Md.
Filed Aug. 22, 1961, Ser. No. 133,211
4 Claims. (Cl. 77—77)

This invention relates to new and useful improvements in so-called sweep or fly cutters used for cutting round holes or discs, and in particular the invention concerns itself with certain structural and functional improvements in cutters of the type disclosed in my co-pending United States patent application Serial No. 850,916 filed November 4, 1959, now Patent No. 3,019,676, dated Feb. 6, 1962, of which this application is a continuation-in-part.

The principal object of the present invention is to provide an improved fly cutter with micrometrical adjustment which embodies in its construction a cover or casing for protecting the screw-threaded shaft of the device against deposits of dirt and against possible physical damage when the cutter is not being used.

Another important object of the present invention is to provide the cutter with improved indicating means whereby the setting of its micrometrical adjustment may be more easily and conveniently determined.

Still another object of the present invention is to provide an improved cutter wherein adjustment between minimum and maximum cutting radii may be made with greater ease and expediency than in cutters of conventional types.

Some of the advantages of the present invention reside in its simplicity of construction, efficient operation, in its durability and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view, partly in section, showing one embodiment of the present invention;

FIGURE 2 is a top plan view thereof;

FIGURE 3 is a longitudinal sectional view, taken substantially in the plane of the line 3—3 in FIGURE 2;

FIGURE 4 is a cross-sectional view, taken substantially in the plane of the line 4—4 in FIGURE 3;

FIGURE 5 is a sectional detail, taken substantially in the plane of the line 5—5 in FIGURE 4;

FIGURE 6 is a side elevational view of the cutter shown in FIGURE 1 but illustrating the same in its closed or retracted position;

FIGURE 7 is a fragmentary side elevational view showing a modified embodiment of the invention;

FIGURE 8 is a fragmentary cross-sectional view, taken substantially in the plane of the line 8—8 of FIGURE 7;

FIGURE 9 is a fragmentary sectional view, taken substantially in the plane of the line 9—9 in FIGURE 8; and FIGURE 10 is a fragmentary sectional view, taken substantially in the plane of the line 10—10 in FIGURE 8.

Referring now to the accompanying drawings in detail, more particularly to FIGURES 1–5 inclusive, the fly cutter with micrometrical adjustment in accordance with the present invention is designated generally by the reference numeral 15 and embodies in its construction a substantially cylindrical body 16 consisting of a main body portion 17 and a complemental portion 18 which is secured to the main body portion of suitable screws 19. The main body portion 17 is provided in one end thereof with a socket 20 to removably receive a shank 21 whereby the entire device may be attached to a suitable machine such as a drill press, jig borer, lathe, milling machine, or the like, for rotation thereby. The shank 21 is secured in the socket 20 by a set screw 22. The other end of the body portion 17 is similarly provided with a bore or socket 23 to removably receive a locating pin 24, held in the socket 23 by a set screw 25.

The inner end of the socket 23 is open and communicates with a transverse bore 26 formed in the main body portion 17 to slidably receive a screw-threaded shaft 27, the latter being provided with a longitudinal slot or groove 28 into which projects the inner end of the pin 24 so as to prevent the shaft 27 from rotating, while sliding of the shaft in the bore 26 is facilitated.

The outer end portion of the shaft 27 is formed with a transverse socket 29 wherein a suitable cutting tool 30 is removably secured by a set screw 31.

The complemental body portion 18 is provided with a bore 32 and a counterbore 33 coaxial with the bore 26 of the main body portion 17, and the counterbore 33 rotatably receives therein an indicator disc 34, diametrically opposite edge portions of which project outwardly from the body portion 18 through crescent-shaped openings 35 which are created in the opposite side portions of the body portion 18 by the formation of the counterbore 33 therein. The disc 34 is provided with an integral tubular adapter 36 and both the disc and the adapter are internally screw-threaded as at 37 to operatively engage the screw-thread of the shaft 27. The adapter 36 is inserted and suitably secured in the open end portion of a tubular jacket or cover 38 which is rotatably disposed in the bore 32 of the body portion 18 and is provided with a closed outer end 39. A suitable knurled-headed screw 40 is provided in the body portion 18 and is engageable with the disc 34 to lock the disc as well as the associated adapter 36 and jacket 38 against rotation, when so desired. The periphery of the disc 34 is marked with graduations 41 which are readable with respect to pointer lines 42 marked on opposite sides of the body portion 17.

It will be apparent from the foregoing that the cutting radius of the device may be adjusted by simply rotating the disc 34 in the counterbore 33 of the body portion 18, whereby the internal screw-threads 37 in the disc and adapter 36 engaging the threads of the shaft 27 will cause the shaft to slide in the bore 26 while rotation of the shaft is prevented by the pin 24 in the shaft groove 28. As the shaft is slid from a larger to a smaller cutting radius, it passes through the adapter 36 and enters the jacket 38 until it is retracted into the jacket as much as possible when the minimum cutting radius is reached, at which point the cutting tool 30 abuts a flat side or face 43 of the body portion 17, as shown in FIGURE 6. In this retracted position of the shaft the entire device may be stored or set aside when not in use and the screw-threads of the shaft 27 will be effectively protected against possible physical damage and/or accumulation of dirt thereon, by the jacket or cover 38. It is to be noted that the protective feature of the jacket is also realized to a lesser degree even when the shaft 27 is slid from the minimum cutting radius to a larger radius, as long as some portion of the shaft remains within the jacket. The extent of outward sliding of the shaft from the bore 26 is limited by the pin 24 coming in contact with the closed end 44 of the slot or groove 28, while inward sliding of the shaft may be limited by the closed end 45 of the slot, or by contact of the shaft 27 with the closed end 39 of the jacket 38, or by contact of the cutting tool 30 with the body face 43, as may be regarded most suitable.

In conventional cutters of this type the shaft 27 is usually provided with forty threads per inch, with twenty-five graduations being marked on the indicator disc 34.

Thus, one complete turn of the disc advances or retracts the shaft by .025" and forty turns are required to slide the shaft by one inch. However, in the present invention the shaft 27 is provided with ten threads per inch and the disc 34 has one hundred graduations, so that while only ten turns of the disc are necessary to move the shaft by one inch, each graduation of the disc still affords the same, conventional micrometrical adjustment of .001". In this manner, relatively rapid movement of the shaft 27 is afforded with a comparatively small number of rotations of the indicator disc so that adjustment of the tool between its major and minor cutting diameters is greatly facilitated.

Adjustment of the cutting diameter of the tool is effected by merely rotating the jacket 38 by the operator's fingers, for which purpose the outer end portion of the jacket may be knurled as indicated at 38'. In that capacity, the jacket 38 apart from protecting the shaft 27, also functions as a convenient fingerpiece, comparable to the barrel of a conventional micrometer, for quickly and easily setting the tool to any cutting radius desired. Nevertheless, the desired adjustment may be made alternatively by fingers applied directly to the edge portions of the disc 34 which are exposed through the openings 35, although it will be observed that rotation of the disc in this manner cannot be carried out as expeditiously as by rotation of the jacket 38.

Apart from serving as protecting means for the shaft 27 and as means for advancing or retracting the shaft as above outlined, the jacket 38 additionally serves as a retainer or housing for lubricant which may be placed therein for the purpose of lubricating the screw-threads of the shaft 27 as well as the rotating disc 34 in the counterbore 33, so that each time the shaft is retracted into the jacket, its screw-threads are coated with the lubricant and the disc 34 in the counterbore 33 is also lubricated by oozing of lubricant into the counterbore when the shaft is slid outwardly. In this manner a smooth operation of the tool is facilitated without the necessity of lubrication from external sources, and the supply of lubricant in the jacket 38 may be replenished as necessary, by simply removing the screws 19 to separate the body portion 18 from the portion 17 and unscrewing the shaft 27 from the disc 34 and adapter 36.

It will be noted that the provision of the openings 35 at the opposite sides of the body portion 18 will enable both a right-handed and a left-handed operator to properly set the tool by observing the disc graduations 41 selectively with respect to the two pointer lines 42.

The modified embodiment of the invention designated generally by the numeral 50 and shown in FIGURES 7–10 is very similar to the embodiment 15 with the exception that the body 51 of the embodiment 50 is in the shape of a rectangular block, consisting of a main body portion 52 and a complemental portion 53 which is secured to the latter by suitable screws 54. The portion 53 is formed with a bore 55 and a counterbore 56 to rotatably receive, respectively, the jacket 38 on the adapter 36 of the disc 57, but unlike the disc 34, the disc 57 is fully contained in the counterbore 56 and does not project outwardly from the body portion 53. Rather, the disc 57 merely serves to prevent axial movement of the adapter 36 and jacket 38, apart of course from serving to operatively engage the shaft 27 by the screw-threads 37 of the disc and adapter. The disc 57, with the associated adapter and jacket, are lockable against rotation by a knurled-headed screw 58 which is carried by the body portion 53 and is engageable with the periphery of the disc, as will be clearly apparent.

The indicating means in this instance comprise a bevelled dial 59 which is secured to the jacket 38 by a set screw 60 and is provided with graduations 61 readable with respect to a pointer line 62 on the body portion 53, as shown in FIGURE 8.

In addition to their use as micrometrical fly cutters, both embodiments of the invention may be also used as jig boring cutters for making cylindrical holes, with or without undercuts, in work of any desired thickness. This is facilitated by using a cutting tool 30 with a radially outwardly offset cutting point, and in instances where the presence of the pilot pin 24 would constitute an obstruction, the pilot pin may be substituted by a considerably shorter pin which still enters the shaft groove 28 but does not project appreciably below the body portion 17 or 52, as the case may be.

While in the foregoing there have been described and shown the preferred embodiments of the invention, various other modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a micrometer fly cutter, the combination of a body comprising a pair of complemental body sections secured together and provided with coaxial bores, a screw-threaded shaft slidably but non-rotatably positioned in the bore of one of said body sections and projecting outwardly therefrom, a cutting tool carried by the projecting end portion of said shaft, the other of said sections being provided with a counterbore facing the first section, a disc-shaped member rotatably positioned in said counterbore and provided with a screw-threaded opening coaxial with said bores, and a tubular jacket having an open inner end portion rotatable in the bore of said other body section and secured to said disc-shaped member for rotation therewith, said jacket projecting outwardly from the bore of said other section and having a closed outer end, said shaft operatively engaging the screw-threaded opening of said disc-shaped member whereby rotation of the latter by said jacket may cause sliding of said shaft in and out of said jacket.

2. The device as defined in claim 1 together with means proivded on one of said body sections and engageable with said disc-shaped member for releasably locking the same against rotation.

3. The device as defined in claim 1 together with micrometrical means for indicating rotational setting of said disc-shaped member relative to said body.

4. The device as defined in claim 1 together with a tubular adapter carried by said disc-shaped member and secured in said open inner end portion of said jacket, said adapter being provided with internal screw-threads constituting a continuation of said screw-threaded opening of the disc-shaped member.

References Cited in the file of this patent
UNITED STATES PATENTS

| | | |
|---|---|---|
| 986,319 | Sheehy | Mar. 7, 1911 |
| 3,008,231 | Caproni | Nov. 14, 1961 |
| 3,019,676 | Bogdan | Feb. 6, 1962 |